(12) United States Patent
Nakanishi et al.

(10) Patent No.: US 6,732,488 B2
(45) Date of Patent: May 11, 2004

(54) SEALING DEVICE FOR PACKAGING MATERIAL AND MEASURING METHOD FOR FUSION TEMPERATURE OF PLASTICS

(75) Inventors: Nozomu Nakanishi, Wakayama (JP); Toshiki Okazaki, Wakaya (JP); Shoji Uchikura, Wakayama (JP); Yasuaki Kotani, Kawasaki (JP); Kazuo Shimamoto, Kawasaki (JP); Masami Kikuchi, Moka (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/018,811

(22) PCT Filed: Apr. 24, 2001

(86) PCT No.: PCT/JP01/03522

§ 371 (c)(1),
(2), (4) Date: Dec. 21, 2001

(87) PCT Pub. No.: WO01/81070

PCT Pub. Date: Nov. 1, 2001

(65) Prior Publication Data

US 2003/0097825 A1 May 29, 2003

(51) Int. Cl.$^7$ .................................................. B65B 51/14
(52) U.S. Cl. .................................. 53/374.8; 156/308.4
(58) Field of Search ......................... 53/371.8, 374.8; 156/308.4, 290

(56) References Cited

U.S. PATENT DOCUMENTS 2,970,414 A * 2/1961 Rohdin ........................ 53/559
3,182,432 A * 5/1965 Canfield ..................... 53/374.8
4,081,942 A * 4/1978 Johnson ........................ 53/407
4,183,964 A * 1/1980 Vinokur ........................ 53/450
4,346,196 A    8/1982 Hoh et al.
4,369,611 A    1/1983 Canfield
4,674,266 A * 6/1987 Araki ......................... 53/374.8
4,927,474 A    5/1990 Pawloski
4,949,846 A * 8/1990 Lakey ......................... 53/374.4
6,197,136 B1   3/2001 Hishinuma

FOREIGN PATENT DOCUMENTS

| DE | 3125393 | 1/1983 |
|---|---|---|
| EP | 1 033 238 A1 | 9/2000 |
| GB | 943457 | 12/1963 |
| JP | 59-12522 B2 | 3/1984 |
| JP | 60-77830 A | 5/1985 |
| JP | 64-32304 U | 2/1989 |
| JP | 3-162228 A | 7/1991 |
| JP | 4-339736 A | 11/1992 |
| JP | 5-330521 A | 12/1993 |
| JP | 63-67207 A | 3/1998 |
| JP | 2000-95217 | 4/2000 |
| JP | 2000-094523 | 4/2000 |

* cited by examiner

Primary Examiner—John Sipos
(74) Attorney, Agent, or Firm—Birch, Stewart, Kolasch & Birch, LLP

(57) ABSTRACT

A sealing device 30 for a packaging material 10, comprising a linear sealing device 31 for sandwiching layers to be sealed 11A, 12A of plastic sheets 11, 12 are sandwiched by sealing bars 41, 42 narrower than a sealing width, and pressuring the layers to be sealed in a heated state, a surface sealing device 32 for sandwiching the layers to be sealed 11A, 12A of the plastic sheets 11, 12 with sealing bars 51, 52 of a width necessary for sealing by the sealing width, and pressing the layers to be sealed in a melting state.

11 Claims, 8 Drawing Sheets

FIG.5
(A) IN THE CASE THERE IS ONE PEAK
(B) IN THE CASE THERE ARE TWO PEAKS, AND ARE OVERLAPPED
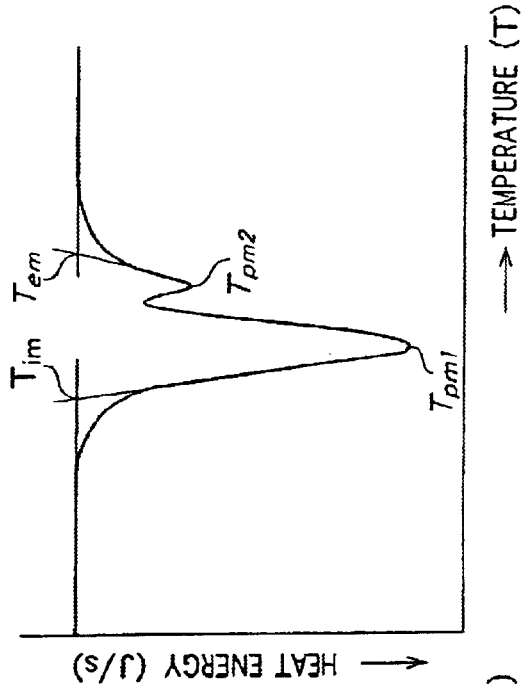
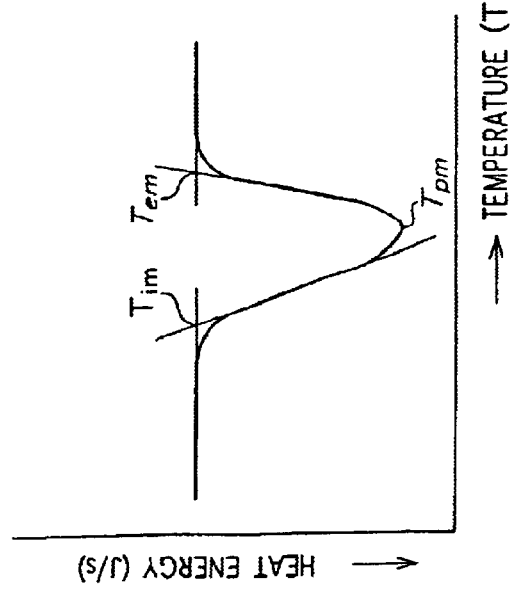
$T_{pm}$ : MELTING PEAK TEMPERATURE
$T_{im}$ : EXTRAPOLATED MELTING ONSET TEMPERATURE
$T_{em}$ : EXTRAPOLATED MELTING END TEMPERATURE

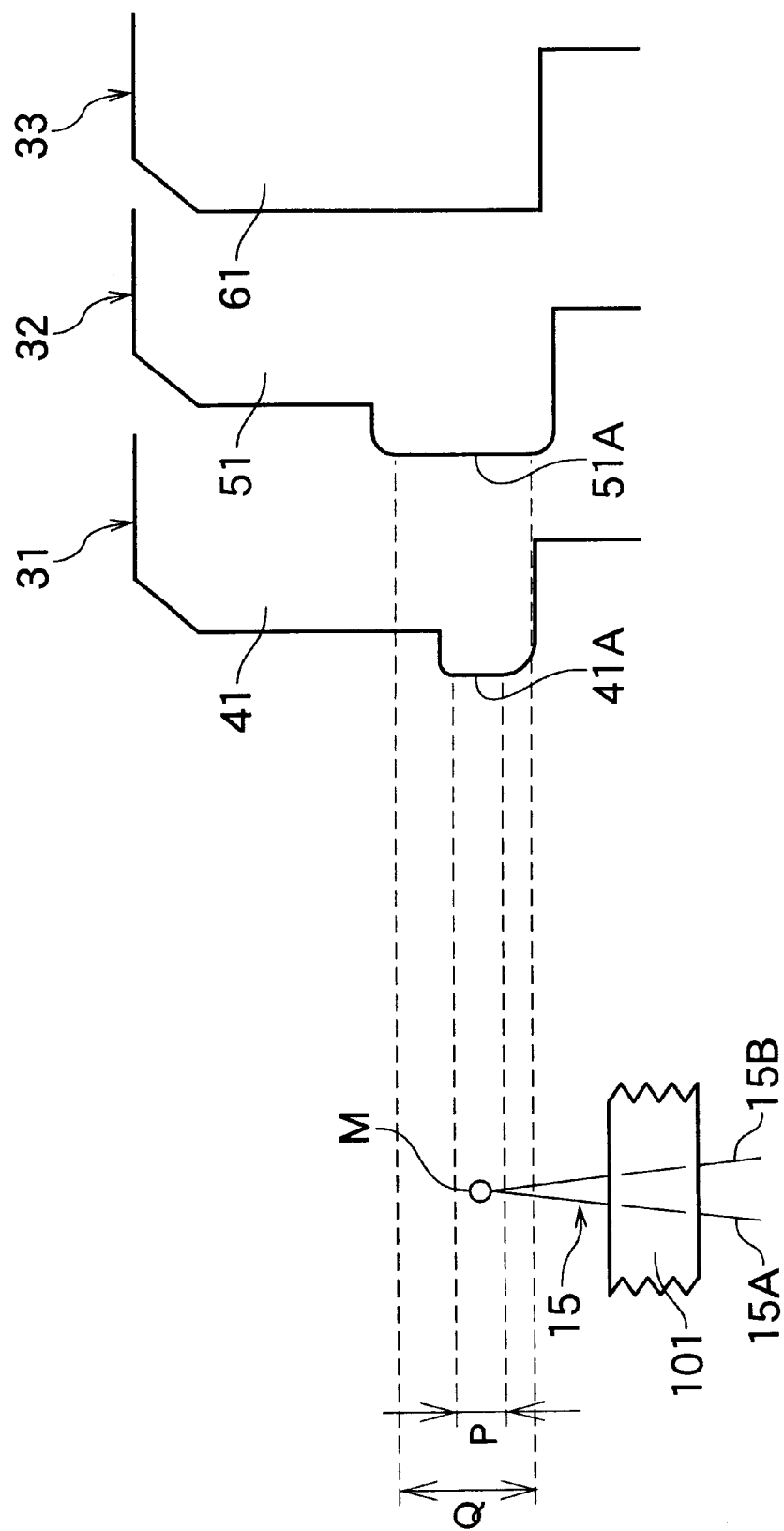

SEALING DEVICE FOR PACKAGING MATERIAL AND MEASURING METHOD FOR FUSION TEMPERATURE OF PLASTICS

This application is the national phase under 35 U.S.C. §371 of PCT International Application No. PCT/JP01/03522 which has an International filing date of Apr. 24, 2001, which designated the United States of America.

BACKGROUND OF THE INVENTION

1. Technical Field

The present invention relates to a sealing device for a packaging material, such as a standing pouch, a pillow package, a blister package, and a tube to be used for a refill, made of a single layer plastic sheet, and a laminated plastic sheet. The present invention also relates to a measuring method for fusion temperature of plastics, such as a sealing temperature of a plastic sheet comprising a packaging material such as a standing pouch, and a tube.

2. Background Art

A packaging material comprising plastic sheets is used for sealing by overlapping layers to be sealed (sealant layers) of the plastic sheets facing with each other, and pressuring the same with a sealing bar (mold) such as a heat sealing bar from the outside so as to press and fuse the layers to be sealed in a melting temperature state.

(A) In conventional sealing devices, it comprises either a surface sealing device for pressuring layers of plastic sheets to be sealed with a seal bar of a width necessary for sealing by the plastic sheet sealing width so as to press the layers to be sealed in a melting state, and a cooling sealing device disposed subsequent thereto, for pressuring the layers to be sealed of the plastic sheets, pressed by the surface sealing device with a cooling sealing bar so as to cool and solidify the pressed state of the layers to be sealed.

However, the conventional technique involves the following problems.

(1) It is difficult to pressure the entire area of the layers of the plastic sheets to be sealed with a sealing bar stably by a high pressure in the surface sealing device or the cooling sealing device. At a part with a weak pressure, entanglement of the plastic cannot be produced sufficiently, and thus the risk of sealing failure is involved. If a high pressure is provided to the entire area, the layers to be sealed are deformed so that a necessary thickness cannot be retained.

(2) If a liquid (filling content of the packaging material) or a highly viscous product thereof is adhered on the layers of the plastic sheets to be sealed, the sealing operation is executed with the liquid disposed between the layers to be sealed, and thus the risk of sealing failure is involved.

SUMMARY OF THE INVENTION

An object of the present invention is to certainly press and seal layers of plastic sheets to be sealed, facing each other.

(B) Moreover, as to the sealing temperature administration for a plastic sheet in the conventional production of a packaging material, merely the heat sealing bar surface temperature and the surface temperature of the layers to be sealed or the plastic sheets are measured with a contact type thermometer or a non-contact type thermometer (infrared ray thermometer, or the like), but the temperature of the sealant material at the time of actually fusing is not measured.

However, according to the knowledge of the present inventors, in order to certainly fuse the plastic sheets, the temperature of the layers of the plastic sheets to be sealed should be an extrapolated melting end temperature or more, higher than the melting peak temperature of the plastic, and thus the temperature of the layers to be sealed (sealant material) should be administered accurately. With a temperature lower than the extrapolated melting end temperature, although a part of the molecular weight of the plastic comprising the layers to be sealed is melted, a molecular weight side is not melted so that an unstable sealing may be provided.

An object of the present invention is to accurately measure the temperature of the sealant material at the time of actually fusing the plastic. The extrapolated melting end temperature will be explained in an embodiment.

An object of the present invention is to accurately measure the temperature of the sealant material at the time of actually fusing the plastic sheet comprising a packaging material, or the like.

(A) The present invention provides a sealing device for a packaging material for overlapping layers of plastic sheets to be sealed, facing each other, pressuring the same from the outside with a sealing bar, and pressing the layers to be sealed in a melting state by a predetermined sealing width so as to be sealed, comprising a linear sealing device for pressuring the layers of the plastic sheets to be sealed, the layers of plastic sheets being pressured with a sealing bar having a width narrower than the sealing width, and pressuring the layers to be sealed in a heated state, and a surface sealing device disposed subsequent to the linear sealing device, for pressuring the layers to be sealed including the part pressured by the linear sealing device with a sealing bar having a width necessary for sealing by a sealing width, and pressing the layers to be sealed in a melting state.

(B) Moreover, the present invention is for measuring the temperature with a temperature measuring contact comprising a thermometer mounted on a fused part of a plastic.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A–5B is a graph showing a melting temperature characteristic of a plastic sheet;

FIG. 9 is a schematic diagram showing the mounting positional relationship of the sealing device and the thermocouple.

DETAILED DESCRIPTION OF THE PREFERRED EMBODIMENTS (A) Sealing Device for a Packaging Material FIG. 1 shows a filling sealing device 20 for filling a packaging material 10 such as a standing pouch with a content such as a detergent, and sealing the same. The filling sealing device 20 comprises a bag supplying part 21, a bag printing part 22, a bag opening part 23, a spare part 24, a filling part 25, a spare part 26, a first sealing part 27, a second sealing part 28, and a cooling part (and bag discharging part) 29.

Figure 1:
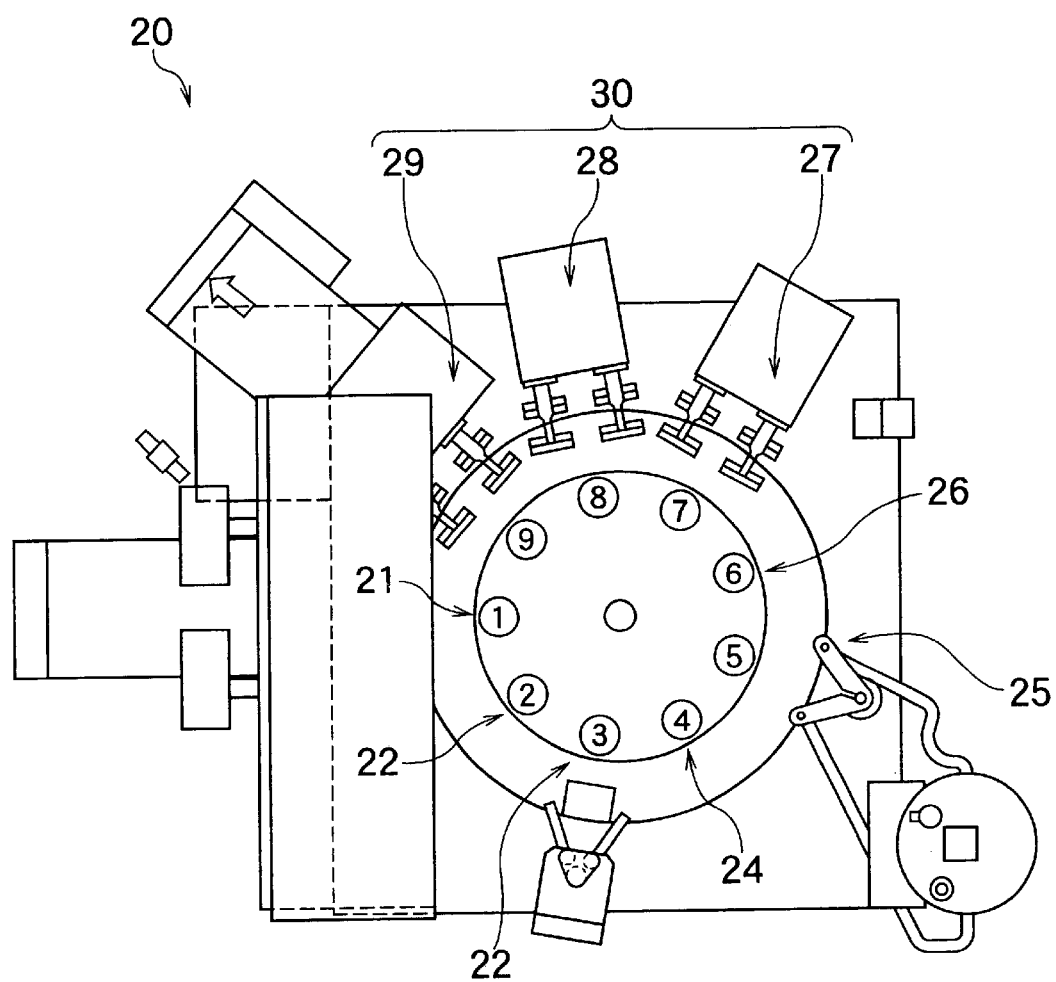
FIG. 1 is a schematic diagram showing a filling sealing device for a packaging material.

In the filling sealing device 20, the packaging material 10 in a bag state having the upper part opened, with plastic sheets 11, 12 facing with each other and a bottom part plastic sheet (not shown) preliminarily sealed at both side parts and the bottom part is supplied to the bag supplying part 21. After filling a content from the upper part opening by the filling part 25, the layers to be sealed 11A, 12A of the upper part opening are overlapped, pressed and sealed with each other by the first sealing part 27, the second sealing part 28, and the cooling part 29 comprising a sealing device 30 according to the present invention. As the plastic sheets 11, 12, for example, those comprising an outer layer of, for example, a polyethylene terephthalate, a gas barrier layer bonded with the outer layer of, for example, an aluminum foil, and thermally fusible layers to be sealed 11A, 12A bonded with the gas barrier layer of, for example, a polyethylene, can be used.

The sealing device 30 comprises a linear sealing device 31 in the first sealing part 27, a surface sealing device 32 in the second sealing part 28, and a cooling sealing device 33 in the cooling part 29. The filling sealing device 20 comprises two sets of the linear sealing devices 31, the surface sealing devices 32, and the cooling sealing devices 33 each in the first sealing part 27, the second sealing part 28, and the cooling part 29 for improving the productivity.

Figure 2:
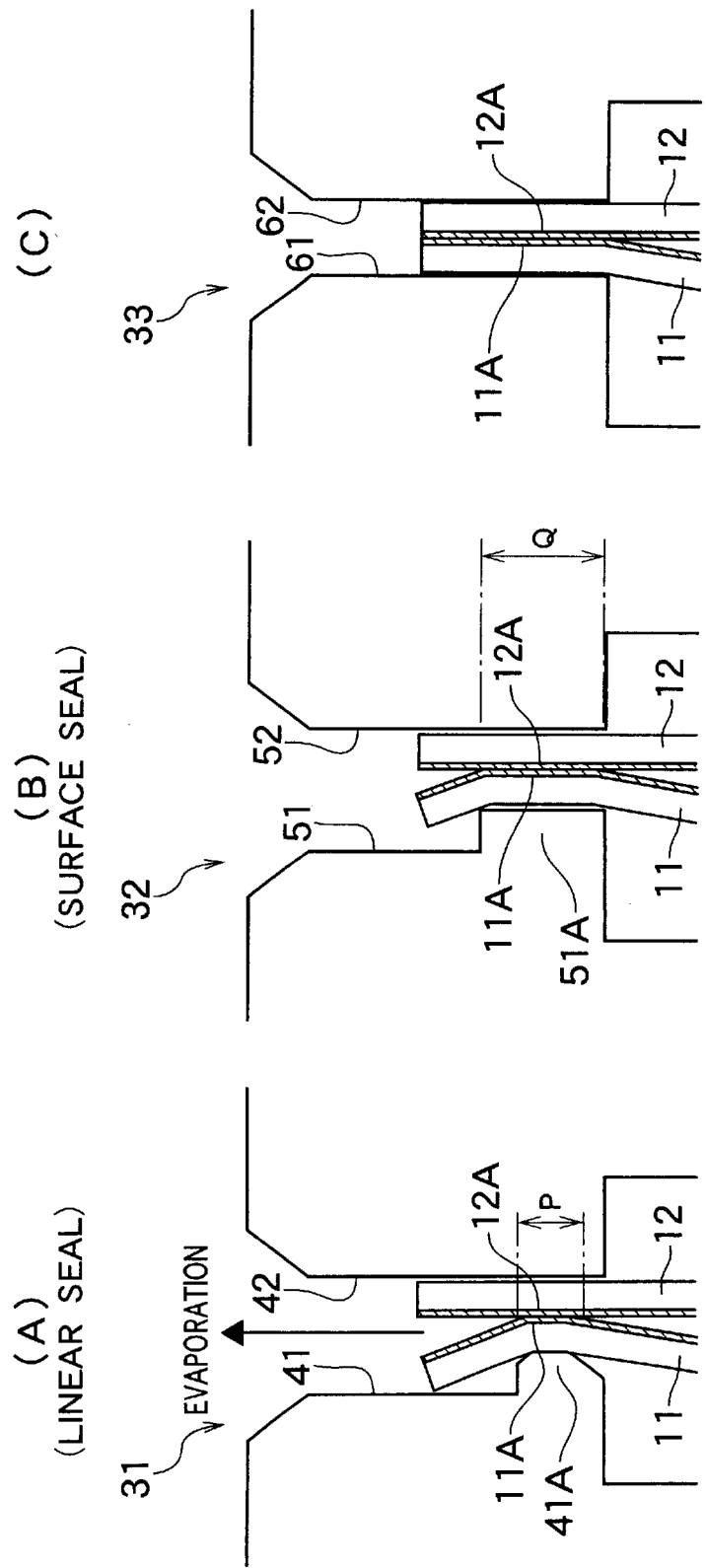
FIGS. 2A–2C is a schematic diagram showing a sealing mechanism of the sealing device.

As shown in FIG. 2(A), the linear sealing device 31 comprises a pair of sealing bars 41, 42 for sandwiching the plastic sheets 11, 12. The sealing bar 41 and/or 42 comprises a narrow width pressuring part 41A and/or 42A (width P) (P is 90% or less with respect to the sealing width. It is 0.1 to 2 mm, more preferably 0.7 to 1.2 mm in the case the sealing width is more than 2.5 mm, and 0.1 to 1.5 mm, more preferably 0.7 to 1.2 mm in the case the sealing width is 2.5 mm or less.). In the linear sealing device 31 according to this embodiment, the sealing bars 41, 42 are provided as heat sealing bars storing a heater so that the plastic sheets 11, 12 can be heated by the sealing bars 41, 42 themselves. That is, the linear sealing device 31 sandwiches the layers to be sealed 11A, 12A of the plastic sheets 11, 12 by the sealing bars 41, 42 of a width narrower than the sealing width defined by the narrow width pressuring part 41A for pressuring the layers to be sealed 11A, 12A in the heated state. The same is applied to 42A.

As shown in FIG. 2(B), the surface sealing device 32 comprises a pair of sealing bars 51, 52 for sandwiching the plastic sheets 11, 12. The sealing bar 51 and/or 52 comprises a wide width pressuring part 51A and/or 52A ((width Q) (preferably Q>P(mm)) of a width necessary for sealing by a sealing width. In the surface sealing device 32 according to this embodiment, the sealing bars 51, 52 are provided as heat sealing bars storing a heater so that the plastic sheets 11, 12 can be heated by the sealing bars 51, 52 themselves. That is, the surface sealing device 32 is disposed subsequent to the linear sealing device 31 such that it sandwiches the layers to be sealed 11A, 12A of the plastic sheets 11, 12 including the part pressured by the linear seal 31 by the sealing bars 51, 52 of a width necessary for sealing by the sealing width defined by the wide width pressuring part 51A for pressing the layers to be sealed 11A, 12A in the melting state. The same is applied to 52A.

As shown in FIG. 2(C), the cooling sealing device 33 comprises a pair of cooling sealing bars 61, 62 for sandwiching the plastic sheets 11, 12. The cooling sealing bars 61, 62 store a cooling water circulation path, or the like so that the plastic sheets 11, 12 can be cooled down by the sealing bars 61, 62 themselves. That is, the cooling sealing device 33 is disposed subsequent to the surface sealing device 32 such that it sandwiches the layers to be sealed 11A, 12A of the plastic sheets 11, 12 including the part pressed by the surface sealing device 32 by the cooling sealing bars 61, 62 for cooling and solidifying the layers to be sealed 11A, 12A in the pressed state.

Figure 3:
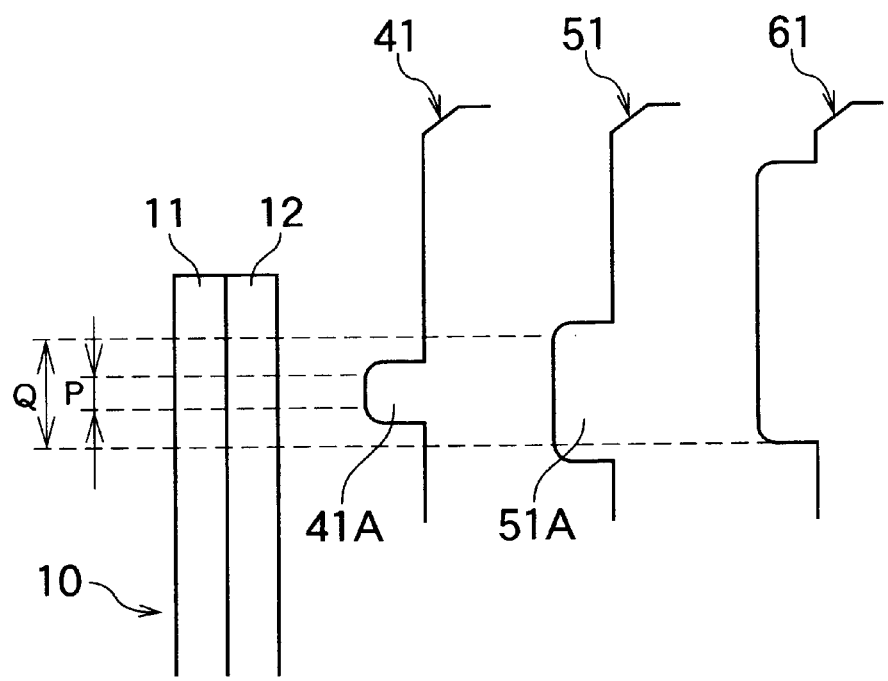
FIG. 3 is a schematic diagram showing the positional relationship of a sealing bar comprising the sealing device.

In the sealing device 30, as shown in FIG. 3, the sandwiching position of the sealing bars 41, 42 (narrow width pressuring part 41A) of the linear sealing device 31, the sandwiching position of the sealing bars 51, 52 (wide width pressuring part 51A) of the surface sealing device 32, and the sandwiching position of the sealing bars 61, 62 of the cooling sealing device 33 corresponding to the layers to be sealed 11A, 12A of the plastic sheets 11, 12 are disposed, overlapping with each other. Accordingly, the surface sealing device 32 sandwiches the layers to be sealed 11A, 12A of the plastic sheets 11, 12 including the part pressured by the linear sealing device 31, and the cooling sealing device 33 sandwiches the layers to be sealed 11A, 12A of the plastic sheets 11, 12 including the part pressed by the surface sealing device 32.

Figure 4:
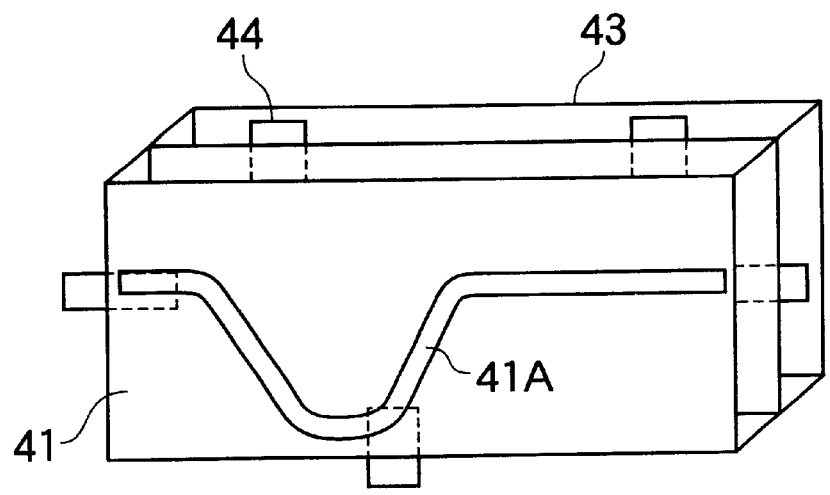
FIG. 4 is a schematic diagram showing an adjusted embodiment of a pressuring state of the sealing bar.

Moreover, in the sealing device 30, each of the sealing bars 41, 42, the sealing bars 51, 52, and the cooling sealing bars 61, 62 needs to pressure the entire region of the layers to be sealed 11A, 12A evenly in the linear sealing device 31, the surface sealing device 32, and the cooling sealing device 33. In a part with a weak pressure, the heat amount and the pressure necessary for sealing cannot be provided sufficiently, and thus there is a possibility of sealing failure. The pressuring state of the sealing bar 41, or the like is adjusted, for example, as shown in FIG. 4, by the thickness adjustment of a shim 44 provided at a plurality of positions in the periphery of the pressuring part 41A in a mounting base 43 with the sealing bar 41, or the like mounted.

For certain sealing by the sealing device 30, the sealing surface temperature of the layers to be sealed 11A, 12A of the plastic sheets 11, 12 should be the extrapolated melting end temperature of the plastic or more. That is, it is important that the sealing surface temperature in the pressuring final stage by the linear sealing device 31, the sealing surface temperature in the pressing final stage by the surface sealing device 32, and in particular, the sealing surface temperature immediately before pressing by the cooling sealing device 33 is the extrapolated melting end temperature or more. With less than the extrapolated melting end temperature, although the low molecular weight side of the plastic comprising the layers to be sealed 11A, 12A is melted, there is a possibility of an unstable sealing without melting of the high molecular weight side.

The extrapolated melting end temperature of the plastic can be measured by the JIS K7121 (testing methods for transition temperature of plastics). Here, the transition temperature of the layers to be sealed 11A, 12A is measured, and the extrapolated melting end temperature at the time is shown in FIG. 5(A) with the melting peak temperature and the extrapolated melting onset temperature. As shown in FIG. 5(A), the extrapolated melting end temperature is a temperature at the intersection of the extrapolated part of the straight line approximated the substantially straight line part of a peak curve at the melting peak temperature or more, and the base line. The sealing surface temperature of the layers to be sealed 11A, 12A can be found by, for example, as shown in FIG. 5(B), mounting a thermocouple 70 with a 0.1 mm diameter on the sheet surface of the layers to be sealed 11A, 12A, heating and pressing the layers to be sealed 11A, 12A as mentioned above, and converting the minute voltage generated in the process into the temperature.

Figure 6:
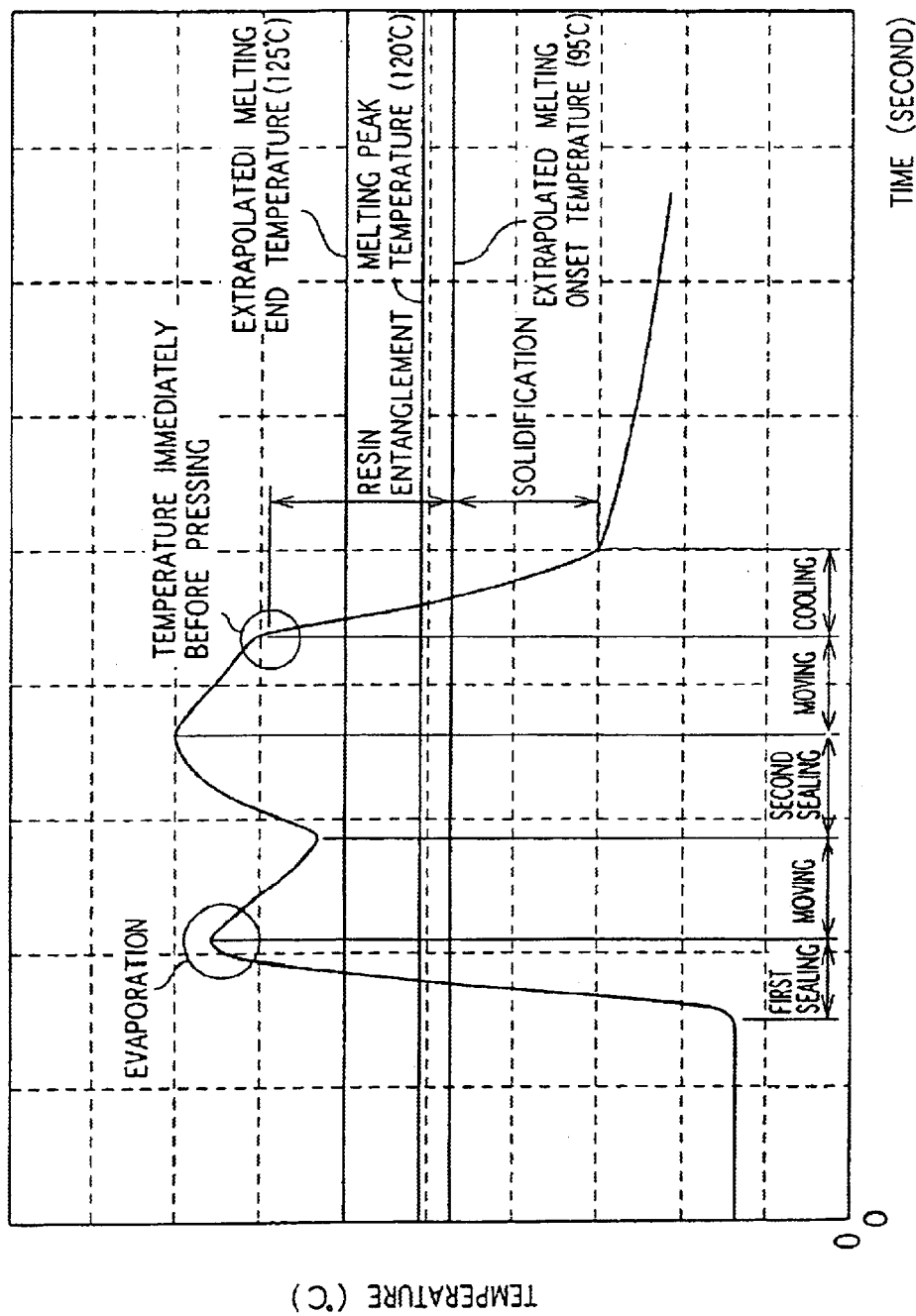
FIG. 6 is a graph showing a sealing temperature condition of the sealing device.

Therefore, the sealing operation by the sealing device 30 is executed as follows (FIG. 6).

(1) First Sealing

In the linear sealing device 31 of the first sealing part 27, with the layers to be sealed 11A, 12A of the plastic sheets (for example low density polyethylene (LDPE) sheet) 11, 12 sandwiched by the sealing bars 41, 42 of the narrow sealing width, the layers to be sealed 11A, 12A are heated (for example, the sealing surface temperature is 175° C.) to the extrapolated melting end temperature (for example, it is 125° C.) or more, and pressured (for example, P=1 mm). In this first sealing step, liquid adhered on the layers to be sealed 11A, 12A, or the like, is eliminated from the sealing surface, the water content is evaporated, the layers to be sealed are melted, and the periphery of the pressuring part is pre-heated.

(2) Second Sealing

In the surface sealing device 32 of the second sealing part 28, with the layers to be sealed 11A, 12A of the plastic sheets 11, 12 sandwiched by the sealing bars 51, 52 of the width necessary for sealing by the sealing width (for example, Q=6 mm or Q=4 mm), the entirety of the layers to be sealed 11A, 12A are melted and pressed again to the extrapolated melting end temperature or more (for example, the sealing surface temperature is 170° C.).

(3) Third Sealing

In the cooling sealing device 33 of the cooling part 29, the layers to be sealed 11A, 12A of the plastic sheets 11, 12 in the state at the extrapolated melting end temperature or more are sandwiched by the cooling sealing bars 61, 62 for cooling and solidifying the layers to be sealed 11A, 12A in the pressed state.

According to this embodiment, the following effects can be provided.

(Effects Corresponding to Claim 1)

(1) Since the layers to be sealed 11A, 12A of the plastic sheets 11, 12 are sandwiched by the sealing bars 41, 42 narrower than the sealing width of the linear sealing device 31, the entire region of the layers to be sealed 11A, 12A can be sandwiched stably with a high pressure so that entanglement of the plastic can be produced sufficiently.

(2) According to the sealing bars 41, 42 narrower than the sealing width of the linear sealing device 31, even in the case a liquid or a highly viscous produce thereof is adhered on the layers to be sealed 11A, 12A, these substances can be eliminated by heating for evaporation, or extrusion by a high pressure, and thus the sealing property of the subsequent surface sealing device 32 can be improved.

(3) In the case the sealing bars 41, 42 narrower than the sealing width of the linear sealing device 31 are heat sealing bars, the pressuring part of the layers to be sealed 11A, 12A can be heated evenly as well as the peripheral part thereof can be heated in a stable temperature state with a small temperature irregularity in the entire working surface of the sealing bars 41, 42, and thus the sealing property in the subsequent surface sealing device 32 can be improved.

(4) The sealing bars 51, 52 of the width necessary for sealing by the sealing width of the surface sealing device 32 presses a wider part of the layers to be sealed 11A, 12A including the pressuring part of the above-mentioned items (1) to (3) by the linear sealing device 31 certainly in a melting state.

(Effects Corresponding to Claim 2)

(5) Since the cooling sealing bars 61, 62 of the cooling sealing device 33 presses the layers to be sealed 11A, 12A including the pressuring part of the above-mentioned item (4) by the surface sealing device 32 in a melting state and cools down to the solidifying temperature, the sealing operation can be executed certainly.

(Effects Corresponding to Claim 3)

(6) Since the melting temperature at the time of pressing by the surface sealing device 32 is the extrapolated melting end temperature or more of the plastic comprising the layers to be sealed 11A, 12A, the layers to be sealed 11A, 12A can be sealed completely with the high molecular weight side of the plastic with a dispersed molecular amount also melted completely (Effects Corresponding to Claim 4)

(7) Since the melting temperature immediately before pressing by the cooling sealing device 33 is the extrapolated melting end temperature or more of the plastic comprising the layers to be sealed 11A, 12A, the layers to be sealed 11A, 12A can be sealed completely with the high molecular weight side of the plastic with a dispersed molecular amount also melted completely.

The sealing device according to the present invention can be adopted also to those for sealing with layers to be sealed of three or more plastic sheets overlapped with each other.

Moreover, the sealing device according to the present invention is not limited to a device for heat sealing, but it can also be adopted to those for supersonic sealing, high frequency sealing, hot air sealing for pressing with sealing bars after heating plastic sheets with hot air, or the like.

(B) Melting Temperature Measuring Method for Plastic

Figure 7:
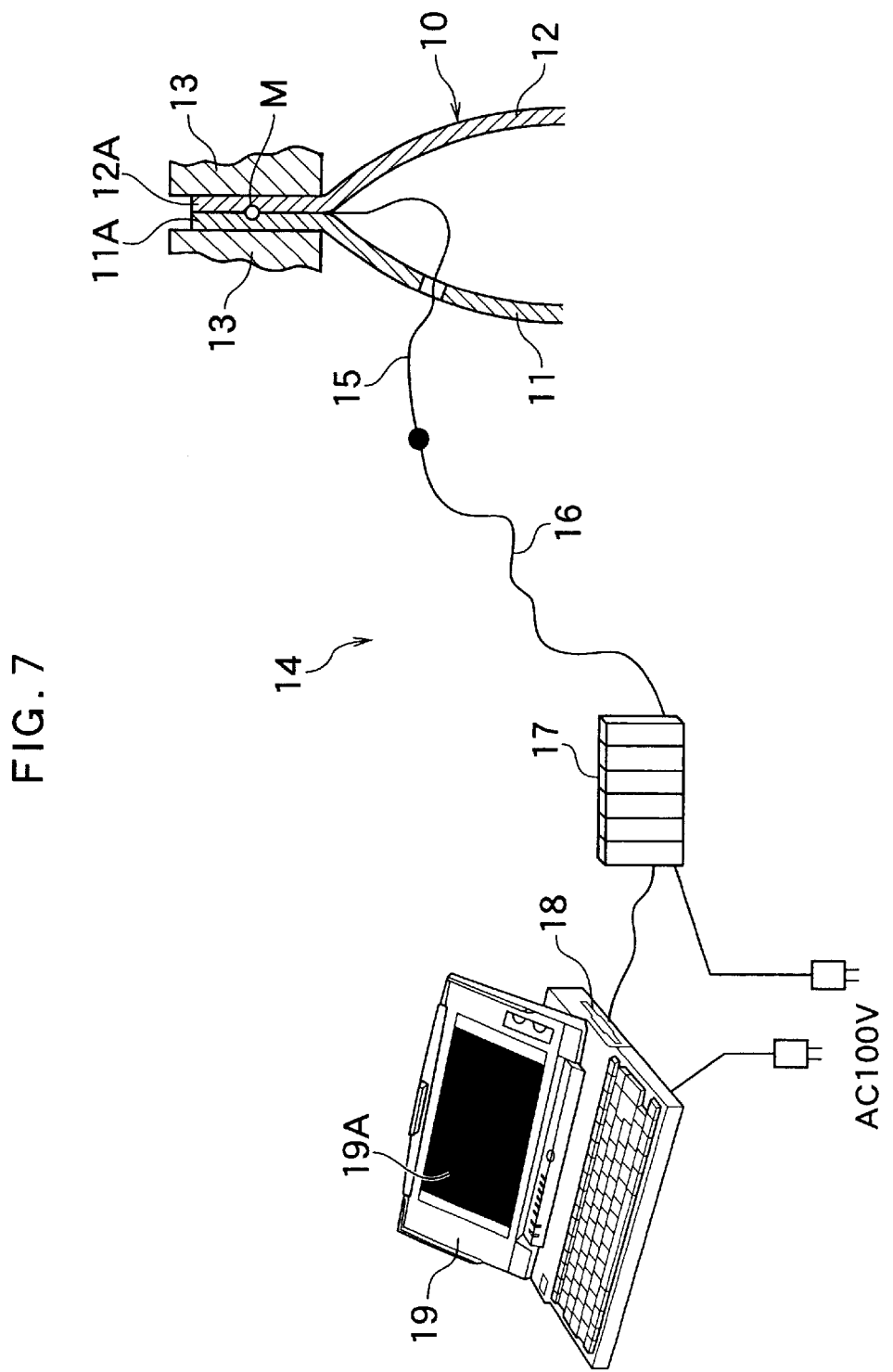
FIG. 7 is a schematic diagram showing a sealing temperature measuring method of the present invention.

FIG. 7 shows a thermoelectric thermometer 14 for measuring the temperature of the sealant material of the layers to be sealed 11A, 12A at the time of sealing by sandwiching the layers to be sealed (sealant layers) 11A, 12A of the plastic sheets 11, 12 facing with each other comprising the packaging material 10 by a pair of the heat sealing bars 13, 13, and pressing (fusing) the layers to be sealed 11A, 12A in a melting state. As the plastic sheets 11, 12, for example, layers to be sealed 11A, 12A comprising an outer layer of, for example, a polyethylene terephthalate, a gas barrier layer bonded with the outer layer of, for example, an aluminum foil, and thermally fusible layers to be sealed 11A, 12A made from a sealant material, bonded with the gas barrier layer of, for example, a polyethylene, can be used.

As the thermometer, a thermoelectric thermometer is preferable. The thermoelectric thermometer 14 is for attaching a temperature measuring contact M of a thermocouple 15 (for example, a combination of wires 15A, 15B made from two kinds of metals of a chlomel and an alumel) on the sealing surface of the layers to be sealed 11A, 12A, connecting a reference contact (0° C. contact) of a compensating lead line 16 connected with the thermocouple 15 with a temperature voltage converter 17, and displays the output temperature of the temperature voltage converter 17 on a display part 19A of a personal computer 19 via an A/D conversion slot card 18. That is, the thermoelectric thermometer 14 is for converting the thermo-electromotive force of the thermocouple 15 determined by the temperature of the temperature measuring point M of the thermocouple 15, which is the sealant material temperature when the layers to be sealed 11A, 12A are actually fused into the temperature thereof in the temperature voltage converter 17, and displaying the same on the display part 19A.

Figure 8:
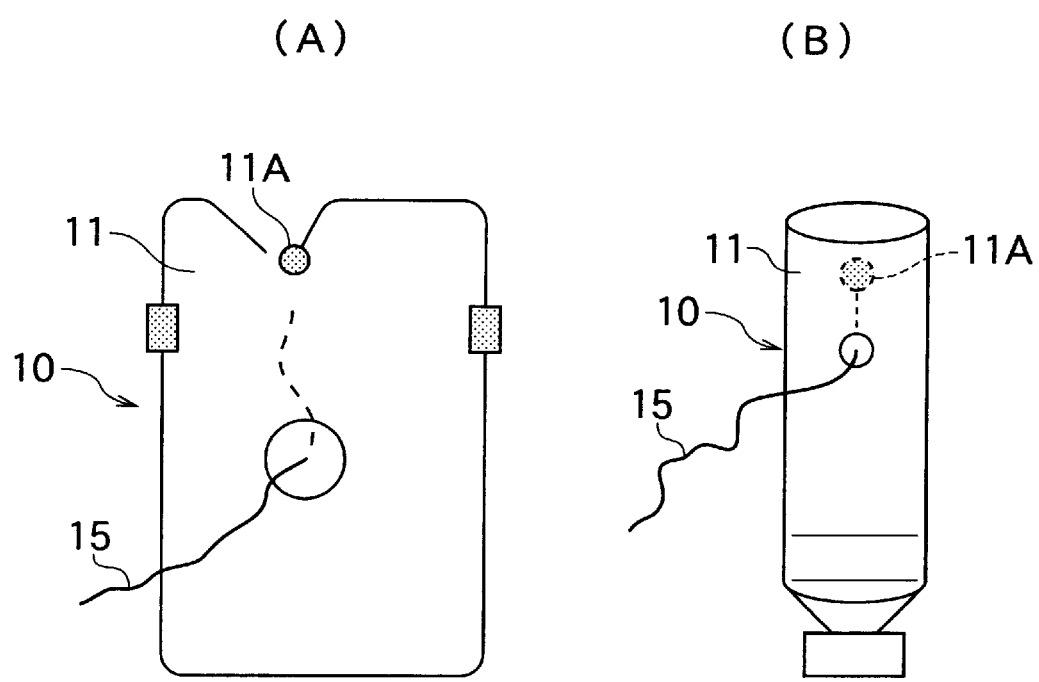
FIG. 8 is a schematic diagram showing a method for setting a thermocouple to a packaging material.

In the case the packaging material 10 is a pouch, as shown in FIG. 8(A), the thermocouple 15 inserted from a notch hole provided in the plastic sheet 11 or 12 is attached on the sealing surface of the layer to be sealed 11A or 12A. In the case the packaging material 10 is a tube, as shown in FIG. 8(B), the thermocouple 15 inserted from a notch hole provided in the plastic sheet 11 or 12 (the plastic sheet 11 and the plastic sheet 12 denotes each of semi circular parts facing with each other of the cylindrical sheet) is attached on the sealing surface of the layer to be sealed 11A or 12A.

Therefore, according to this embodiment, the following effects can be provided.

Since the thermocouple 15 is mounted on the sealing surface of the layers to be sealed 11A, 12A of the plastic sheets 11, 12 facing with each other, and the layers to be sealed 11A, 12A are fused and sealed with the thermocouple 15 sandwiched, the temperature of the sealant material when the plastic sheets 11, 12 are actually fused can be measured directly and accurately by the thermocouple 15. Accordingly, it is confirmed accurately that the layers to be sealed 11A, 12A of the plastic sheets 11, 12 reaches at an appropriate melting temperature at the time of sealing.

Next, an embodiment of adopting the thermoelectric thermometer 14 according to the present invention for measurement of the sealing temperature of the packaging material 10 to be sealed by the sealing device 30 of the filling sealing device 20 will be explained with reference to FIG. 1.

That is, in the sealing device 30, the actual sealing surface temperature of the layers to be sealed 11A, 12A of the plastic sheets 11, 12 comprising the packaging material 10 can be measured using the above-mentioned thermoelectric thermometer 14 as follows.

(1) The temperature measuring contact M of the thermocouple 15 (for example, by peeling off the enamel on each top end of a chlomel wire 15A, and an alumel wire 15B each having a 0.1 mm diameter covered with an enamel, and welding with each other, a temperature measuring contact M is formed), is fixed on the plastic sheet 11 or 12 with an adhesive tape 101 as shown in FIG. 9 such that it is mounted on a position corresponding to the center of the narrow width pressuring part 41A of the linear sealing device 31 in the layers to be sealed 11A, 12A of the plastic sheets 11, 12 of a 0.13 mm thickness. A good response property can be provided in the case the diameter of the chlomel wire 15A and the alumel wire 15B is 0.1 mm or less so that the sealing bars are not destroyed at the time of pressuring, and thus it is preferable.

(2) The layers to be sealed 11A, 12A of the plastic sheets 11, 12 are heated and pressed by the linear sealing device 31, the surface sealing device 32, and the cooling sealing device 33 of the sealing device 30 as mentioned above. The thermo-electromotive force generated in the thermocouple 15 during the process is converted to the temperature by the temperature voltage converter 17, and the temperature is displayed on the display part 19A. The displayed temperature is the actual sealing surface temperature of the layers to be sealed 11A, 12A.

The sealing surface temperature of the layers to be sealed 11A, 12A obtained by measuring the layers to be sealed 11A, 12A of the plastic sheets 11, 12 as in the above-mentioned items (1), (2) is as shown in FIG. 7.

The sealing temperature measuring method for a plastic sheet according to the present invention is not limited for heat sealing, but it can also be adopted for ultrasonic sealing, high frequency sealing, hot air sealing for pressing with sealing bars after heating plastic sheets with hot air, or the like.

Moreover, measuring method for the fusion temperature of plastics according to the present invention is not limited for fusion of plastic sheets, but it can also be adopted for fusing a plastic to another plastic, or fusing a plastic to another material such as a metal.

INDUSTRIAL APPLICABILITY (A) As heretofore explained, according to the present invention, the layers to be sealed of a plastic sheet, facing with each other can be pressed and sealed certainly.

(B) Moreover, according to the present invention, it is possible to accurately measure the temperature of the sealant material at the time of actually fusing the plastic.

The temperature of the sealant material can be measured accurately at the time of actually fusing the plastic sheet comprising the packaging material, or the like. That is, by determining the sealing condition, using the sealant material temperature at the time of actually fusing the plastic sheet comprising the packaging material, or the like, a certain sealing operation can be enabled.

What is claimed is:

1. A sealing device for a packaging material for overlapping layers of plastic sheets to be sealed, the layers of plastic sheets facing each other, pressuring the layers of plastic sheets from the an outside with a sealing bar, and pressing the layers of plastic sheets to be sealed by a predetermined sealing width, while the layers of plastic sheets are in a melting state, comprising:

a linear sealing device for pressuring the layers of plastic sheets to be sealed with a pressuring portion of a sealing bar having a width narrower than the predetermined sealing width, said linear sealing device pressuring the layers of plastic sheets to be sealed, while the layers of plastic sheets are in a heated state; and a surface sealing device disposed subsequent to the linear sealing device, for pressuring the layers of plastic sheets to be sealed including the part pressured by the linear sealing device with a pressuring portion of a sealing bar having a width necessary for forming the predetermined sealing width, said surface sealing device pressing an entire region of the layers of plastic sheets to be sealed, while the layers of plastic sheets are in a melting state, wherein the melting temperature of the layers of plastic sheets to be sealed at the time of pressing by the surface sealing device is an extrapolated melting end temperature or more of the plastic comprising the layers of plastic sheets to be sealed.

2. A sealing device for a packaging material for overlapping layers of plastic sheets to be sealed, the layers of plastic sheets facing each other, pressuring the layers of plastic sheets from an outside with a sealing bar, and pressing the layers of plastic sheets to be sealed, while the layers of plastic sheets are in a melting state, comprising:

a linear sealing device for pressuring the layers of plastic sheets to be sealed with a pressuring portion of a sealing bar having a width narrower than the predetermined sealing width, said linear sealing device pressuring the layers of plastic sheets to be sealed, while the layers of plastic sheets are in a heated state;

a surface sealing device disposed subsequent to the linear sealing device, for pressuring the layers of plastic sheets to be sealed including the part pressured by the linear sealing device with a pressuring portion of a sealing bar having a width necessary for forming the predetermined sealing width, said surface sealing device pressing an entire region of the layers of plastic sheets to be sealed, while the layers of plastic sheets are in a melting state; and a cooling sealing device disposed subsequent to the surface sealing device, for pressuring the layers of plastic sheets to be sealed including the part pressed by the surface sealing device with a cooling sealing bar so as to cool and solidify the layers of plastic sheets in the pressed state, wherein the melting temperature of the layers of plastic sheets to be sealed at the time of pressing by the surface sealing device is an extrapolated melting end temperature or more of the plastic comprising the layers of plastic sheets to be sealed.

3. The sealing device for a packaging material according to claim 2, wherein the melting temperature of the layers of plastic sheets to be sealed immediately before pressing by the cooling sealing device is an extrapolated melting end temperature or more of the plastic comprising the layers of plastic sheets to be sealed.

4. A sealing device for a packaging material for overlapping layers of plastic sheets to be sealed, the layers of plastic sheets facing each other, pressuring the layers of plastic sheets from an outside with a sealing bar, and pressing the layers of plastic sheets to be sealed, while the layers of plastic sheets are in a melting state, comprising:

a linear sealing device for pressuring the layers of plastic sheets to be sealed with a pressuring portion of a sealing bar having a width narrower than the predetermined sealing width, said linear sealing device pressuring the layers of plastic sheets to be sealed, while the layers of plastic sheets are in a heated state;

a surface sealing device disposed subsequent to the linear sealing device, for pressuring the layers of plastic sheets to be sealed including the part pressured by the linear sealing device with a pressuring portion of a sealing bar having a width necessary for forming the predetermined sealing width, said surface sealing device pressing an entire region of the layers of plastic sheets to be sealed, while the layers of plastic sheets are in a melting state; and a cooling sealing device disposed subsequent to the surface sealing device, for pressuring the layers of plastic sheets to be sealed including the part pressed by the surface sealing device with a cooling sealing bar so as to cool and solidify the layers of plastic sheets in the pressed state, wherein the melting temperature of the layers of plastic sheets to be sealed immediately before pressing by the cooling sealing device is an extrapolated melting end temperature or more of the plastic comprising the layers of plastic sheets to be sealed.

5. The sealing device for a packaging material according to claim 1 or 2, further comprising a device for measuring the temperature of the layers of plastic sheets at the time of pressing by the surface sealing device, said surface sealing device heating the layers of plastic sheets to a predetermined melting temperature as measured by the device for measuring.

6. The sealing device for a packaging material according to claim 5, wherein said predetermined melting temperature is an extrapolated melting end temperature or more of the plastic comprising the layers of plastic sheets to be sealed.

7. The sealing device for a packaging material according to claim 5, wherein said device for measuring the temperature is a thermoelectric thermometer.

8. The sealing device for a packaging material according to claim 6, wherein said device for measuring the temperature is a thermoelectric thermometer.

9. A sealing method for a packaging material for overlapping layers of plastic sheets to be sealed, the layers of plastic sheets facing each other, pressuring the layers of plastic sheets from an outside with a sealing bar, and pressing the layers of plastic sheets to be sealed by a predetermined sealing width, while the layers of plastic sheets are in a melting state, said method comprising the steps of:

performing linear sealing by pressuring the layers of plastic sheets to be sealed with a pressuring portion of a sealing bar having a width narrower than the predetermined sealing width, the layers of plastic sheets being in a heated state during said linear sealing; and performing surface sealing, subsequent to the linear sealing, by pressuring the layers of plastic sheets to be sealed including the part pressured by the linear sealing with a pressuring portion of a sealing bar having a width necessary for forming the predetermined sealing width, the layers of plastic sheets being in a melting state during said surface sealing, wherein the melting temperature of the layers of plastic sheets to be sealed at the time of said surface sealing is an extrapolated melting end temperature or more of the plastic comprising the layers of plastic sheets to be sealed.

10. The sealing method for a packaging material according to claim 9, wherein an entire region of the layers of plastic sheets to be sealed is pressed in a melting state, and is cooled down to a solidifying temperature.

11. The sealing method for a packaging material according to claim 9, wherein the solidifying temperature is an extrapolated melting onset temperature, and the entire region of the layers to be sealed is cooled down to less than the extrapolated melting onset temperature.

* * * * *